United States Patent Office 3,088,940
Patented May 7, 1963

3,088,940
HOMOPOLYMERIZATION OF ACRYLONITRILE WITH CATALYST COMPOSITIONS COMPRISING ORGANO TIN HYDRIDE AND METAL HALIDE COMPLEXES
Lloyd T. Jenkins, Decatur, Ala., assignor, by mesne assignments, to Monsanto Chemical Company, a corporation of Delaware
No Drawing. Filed June 8, 1960, Ser. No. 34,613
6 Claims. (Cl. 260—88.7)

This invention relates to novel catalysts, methods for preparing these catalysts and processes for effecting the addition-polymerization of ethylenically unsaturated monomers in the presence of these catalysts.

In recent years the most significant development in the field of polymerization catalysis has been the utilization of complex compounds in heterogeneous polymerization systems. Thus, for example, in the Reid patent, U.S. Patent 2,355,925, a polymerization process was disclosed wherein liquid polymers were produced from olefins using a catalyst consisting of aluminum chloride, zirconium chloride or titanium chloride in the presence of alkaline earth metals, alkali metals, oxides of alkali or alkaline earth metals, alkali metal alloys, or other such agents which react with hydrogen chloride. Ethylenically unsaturated compounds have also been polymerized in the presence of $TiCl_4$ and Oximes (Howard, U.S. Patent 2,567,109). Many other examples could be given but perhaps the best known among the catalyst systems which embody the principle of surface active initiators to synthesize the polymer structures are those disclosed by Ziegler in German Patents 878,560 and 917,006 and U.S. Patent 2,781,410 wherein aluminum trialkyls complexed with metal halides are employed.

The class of heterogeneous polymerization initiators reported hereinabove have constituted a major advance over the earlier processes wherein free radical type catalysts or redox systems were used to initiate polymerization of olefinic compounds. With the older catalytic systems it is generally necessary to employ very high pressures. Furthermore, the accepted mechanisms by which these systems initiate addition polymerization precludes the possibility of the initiator having even the faintest influence on the polymer structure. In contrast, the aforenoted complex or heterogeneous catalyst systems can be employed at reduced pressures and have been shown to have a directing influence on the addition of monomer units to the polymer chain.

Although the heterogeneous catalyst systems which have been known heretofore offer great advantages they do have certain shortcomings. For example, they generally present hazardous handling problems since many of these materials are spontaneously flammable in air. Furthermore, it has not been possible to date to prepare any non-hydrocarbon polymer with these systems, i.e., polymers from polar monomers.

Accordingly, it is an object of this invention to provide new complex heterogeneous catalyst systems for use in addition-type polymerization reactions which catalysts are capable of initiating the polymerization of polar monomers in addition to being non-flammable in the presence of air.

It is another object of this invention to provide a method for preparing the novel catalysts of this invention.

It is a still further object of this invention to provide methods of polymerizing ethylenically unsaturated monomers in the presence of the novel catalysts of the present invention.

These and other objects of the invention are attained by the use of an organo tin hydride-metal halide complex as the catalyst material. More specifically the catalytic substances of this invention comprise the product formed by the reaction of a compound of the general formula: $R_nSnH_{n_1}$ wherein R is a hydrocarbon radical containing from two to twenty carbon atoms, n is an integer of either two or three and $n_1$ is an integer of one or two, and a metal halide of the general formula $MX_n$ wherein M is a metal from groups IVB and VB of the periodic table, X is a halide and n is an integer of either two, three or four. By "the periodic table" reference is made to the periodic table as prepared by H. G. Deming. This table appears in the textbook by H. G. Deming entitled "Fundamental Chemistry," 2nd ed., John Wiley and Sons, Inc., New York, 1947. It appears at pages 56 and 57 of the Lange's "Handbook of Chemistry," 9th ed. and has been distributed widely by Merck and Company. Thus, when referring hereinafter both in the specification and claims to "the periodic table," the Deming modification of the classic Mendelyeev periodic table of the elements is intended.

As indicated, the organo-tin hydride reactant is a tin hydride which has been substituted with two or three hydrocarbon groups. The hydrocarbon substituent may be cyclic or acyclic. Representative examples of suitable compounds are diethyl tin dihydride, dipropyl tin dihydride, dibutyl tin dihydride, tributyl tin hydride, diamyl tin dihydride, dihexyl tin dihydride, dioctyl tin dihydride, dicyclobutyl tin dihydride, dioctyl tin dihydride, diphenyl tin dihydride and triphenyl tin hydride. It has been found that dibutyl tin dihydride and dioctyl tin dihydride are especially suitable compounds.

These hydrides are high boiling, colorless liquids and are unusually stable even in water. They can be prepared by known methods which are generally applicable to the whole class of compounds. For example, dibutyl tin dihydride can be obtained by reaction of commercially available dibutyl tin dichloride with lithium aluminum hydride which is also commercially available in accordance with the procedure as described at page 366 of "The Journal of Applied Chemistry," vol. 7 (1957).

The metal halide component of the catalyst systems of this invention comprise the halides of the metals found in group IVB and group VB of the periodic table, i.e., titanium, zirconium, hafnium, vanadium, niobium and tantalum. Illustrative examples of metal halides which can be used include titanium dichloride, titanium trichloride, titanium tetrachloride, titanium dibromide, titanium tribromide, titanium tetrabromide, titanium diiodide, titanium triiodide, titanium tetraiodide, titanium trifluoride, titanium tetrafluoride, zirconium dichloride, zirconium trichloride, zirconium tetrachloride, zirconium dibromide, zirconium tetrabromide, zirconium tetraiodide, zirconium tetrafluoride, hafnium trichloride, hafnium tetrachloride, hafnium triiodide, hafnium tetraiodide, vanadium dichloride, vanadium trichloride, vanadium tetrachloride, niobium dichloride, niobium difluoride, tantalum dichloride, tantalum diiodide and the like. Among the suitable metal halides, titanium tetrachloride is particularly outstanding. Mixtures of two or more of the metal halides can be employed if desired.

The complex catalysts of this invention are conveniently prepared by intimately mixing the organo tin hydride and metal halide of choice in an organic solvent under anhydrous conditions and in an inert atmosphere. Examples of suitable solvents are heptane, isooctane, cyclohexane, benzene, toluene, dichloroethane, dioxane and the like, and mixtures thereof. The relative proportions of the two components can be varied quite widely, for example, catalytic activity has been observed when from 0.5 to 25 moles of metal halide were employed per mole of organo tin hydride. Proportions outside this range can be used, but generally best results are obtained when from 0.9 to 10 moles of metal halide are employed per mole of organo tin hydride. After the organo tin hydride and metal halide have been united, reaction takes place at room temperature although lower and higher temperatures may be employed. That is, temperatures in the range of from about −10° C. to about 100° C. or higher can be used. The order in which the components are brought together to form the catalyst complex is generally not critical, however, in certain situations it has been found that improved results are obtained when the metal halide is added to the solvent before the addition of the organo tin hydride. The advantages obtained by this addition sequence appear to have some relationship to the particular solvent used as well as the specific monomer employed in the polymerization reaction. Thus, for example, it has been found that when toluene is employed as a solvent in the polymerization of ethylene, substantially improved results are realized when the metal halide is added to the solvent before the organo tin hydride during preparation of the catalyst complex.

Following formation, the catalyst may be transferred to a separate polymerization reactor in the form of a slurry containing the solvent in which it was formed. Alternatively, the catalyst may be formed in-situ in the polymerization reactor. That is, the components making up the catalyst may be introduced directly into a reactor already containing the monomer or in which the monomer is subsequently added. When this procedure is employed, polymerization occurs simultaneously with the formation of the complex catalyst. Since catalytic activity falls off with ageing, in those instances where the catalyst is prepared in advance no more than one or two days should be permitted to pass prior to use.

The initiators provided by this invention are useful in inducing the addition polymerization of ethylenically unsaturated monomers generally. As illustrative examples of such monomers, there may be mentioned ethylene, propylene, 4-methyl pentene-1, isoprene, butadiene, piperylene, vinyl chloride, styrene, vinyl acetate, acrylonitrile, methyl methacrylate and many other vinyl compounds. Copolymers formed from mixed monomers may also be obtained by the use of these catalysts.

In effecting the polymerization of ethylenically unsaturated monomers, the initiators are contacted with the monomer, preferably under liquid reaction conditions although vapor phase operations are also within the scope of the present invention. Batch or continuous procedures may be employed. In all instances it is necessary to observe the requirement for operating in an inert atmosphere, i.e., for example, by blanketing the reaction zone with nitrogen gas or other inert material. When liquid reaction conditions are employed, organic solvents such as have been noted hereinabove as applicable in the preparation of the catalyst may be used as the reaction medium, i.e., acyclic or cyclic hydrocarbons or halogenated derivatives thereof. Thus, for example there may be mentioned pentane, hexane, heptane, cyclohexane, isooctane, benzene, toluene, dichloroethane, dioxane and the like and mixtures thereof.

The quantity of initiator needed to induce polymerization is not critical; all that is required is that an effective amount be used. Some loss of activity of the initiator can be expected due to the presence of impurities that may be present in the reaction. It is, therefore, desirable to employ more than what may be considered to be trace amounts of the initiators.

The polymerization is ordinarily accomplished by merely admixing the components of the polymerization mixture, and no additional heat is necessary unless it is desired to increase the rate of polymerization or to obtain a product with a selective molecular weight or other specific properties. Excellent results may be obtained with temperatures over the range of 0° C. to 250° C., and particularly good results are obtainable in the range of 25°–175° C. Polymerization can be effected at atmospheric pressures or even lower pressures, and in some instances it may be desirable to use superatmospheric pressures in order to increase the monomer concentration in contact with the catalyst. Although the polymerization pressure may be as high as 2000 atmospheres and even higher, pressures in the range of from atmospheric to 150 atmospheres absolute are generally used. The reaction time can be varied as desired from a period of a few minutes to a number of hours. When a batch process is employed the reaction time generally used is from about 2 to 8 hours. However, when a continuous process is employed, it is not necessary to employ reaction or contact times much beyond one-half to one hour since a cyclic system can be employed involving precipitation of the polymer and return of the vehicle or solvent and unused catalyst to the charging zone wherein the catalyst can be replenished and additional monomer introduced. The amount of vehicle or solvent employed can vary over wide limits in relation to the monomer-catalyst mixture, it being only necessary that sufficient monomer be in solution at any given time to effect reaction thereof. Generally speaking, when the monomer is in higher concentration, the rate of polymerization is increased.

Following the polymerization reaction, the polymer can be separated from the catalyst and solvent by any of several well known methods. One convenient method is to treat the reaction mixture with methanol or a methanol hydrochloric acid mixture followed by a filtering and drying operation.

In order to illustrate the invention with greater particularity, the following specific examples are given, it being understood that they are intended to be only illustrative and not limitative. Parts are given by weight unless otherwise indicated.

*Example I*

A complex catalyst was prepared by adding 7 parts of dibutyl tin dihydride and 85 parts of dry redistilled toluene to a reactor equipped for mechanical agitation. Thereafter, 42 parts of toluene containing 3.8 parts of anhydrous titanium tetrachloride were added thereto and a brown precipitate formed immediately. The reaction was allowed to continue for an hour at 60° C. The catalyst thus formed was then transferred to a pressure reactor in which an inert atmosphere was maintained and an additional 85 parts of toluene was added, after which the reactor temperature was raised to between 120°–130° C. Ethylene was then introduced into the polymerization reactor until the pressure therein reached 500 p.s.i.g. The reaction was allowed to run for 3 hours. The resulting product was then removed from the reactor and the polymer was isolated by treatment with a 10 fold excess of methanol. Polyethylene was recovered by filtration after which it was washed and dried. The polyethylene obtained had a softening point in excess of 140° C. and was found to be of a highly crystalline nature upon X-ray analysis.

*Example II*

A complex catalyst was prepared by adding to a nitrogen blanketed graduated cylinder 400 ml. of toluene and 0.5 ml. of titanium tetrachloride. Thereafter, 10 ml. of dioctyl tin dihydride was added and a dark brown precipitate formed. The thus formed catalyst in the form of a toluene slurry was immediately transferred to a pressure reactor maintained in an inert atmosphere. The temperature of the reactor was then raised to 100° C. and 55 grams of butadiene was introduced from a pressure feed tank. The resulting reaction was allowed to continue for one-half hour during which time the build-up of pressure did not exceed 30 p.s.i.g. The polymer formed was isolated with methanol, filtered, washed and then dried in a vacuum oven. There was recovered 38.7 grams of butadiene polymer having a melting point of 134°–136° C.

*Example III*

A catalyst complex of triphenyl tin hydride and titanium tetrachloride in a molar ratio of 1.00:0.98 was prepared by adding 80 parts of dry redistilled heptane and 3.4 parts of anhydrous titanium tetrachloride to a round bottom flask equipped for mechanical agitation. There was then added to this solution in a dropwise manner 7.0 parts of triphenyl tin hydride in 8 parts of heptane. A dark brown precipitate formed and the complex was allowed to react at 60° C. for 3 hours. There was then introduced slowly into the reaction flask 20 parts of redistilled styrene. The resulting polymerization reaction was run for 4 hours at a temperature of 72° C. The polymer was isolated with methanol, after which it was washed and dried. A 64 percent conversion was realized with 12.8 grams of polystyrene being obtained.

*Example IV*

Into a stirred round bottom flask thoroughly purged with nitrogen there was added 75 parts of dry redistilled dioxane and 48 parts of dry redistilled acrylonitile. To this solution there was then added 2 parts of anhydrous zirconium tetrachloride and 2.5 parts of dibutyl tin dihydride. External heat was applied and the reaction was run for 6 hours at 70° C. The polymer was recovered by filtration and washed thoroughly with methanol and acetone. There was obtained 8.5 grams of polyacrylonitrile.

*Example V*

A catalyst complex of dioctyl tin dihydride and vanadium trichloride in a molar ratio of 1.00:5.60 was prepared by adding 10 ml. of dioctyl tin dihydride to a nitrogen blanketed graduated cylinder containing 0.5 ml. of vanadium trichloride in 400 ml. of toluene. The resulting catalyst was then transferred to a pressure reactor in a slurry consisting of catalyst and toluene. Ethylene was then introduced into the pressure reactor until the pressure rose to 500 p.s.i.g. The polymerization reaction was allowed to continue for 6 hours. The reactor contents were then placed in a methanol-hydrochloric acid solution and allowed to soak overnight. There was recovered 10.6 grams of polyethylene having a melting point of 135°–136° C.

*Example VI*

A catalyst complex of dibutyl tin dihydride and titanium tetrachloride in a molar ratio of 1.00:11.36 was prepared by slowly adding 5 ml. of dibutyl tin dihydride in 50 ml. of dichloroethane to a stirred reactor containing 0.25 ml. of titanium tetrachloride in 100 ml. of dichloroethane. A slight exothermic reaction took place with the formation of a dark brown precipitate. External heat was applied to the reaction mass and the reaction was allowed to continue for 1 hour. The catalyst thus formed was transferred to a pressure reactor in the form of a slurry and was diluted further with 250 ml. of dichloroethane. There was then introduced into the reactor 65 grams of vinyl chloride from a pressure feed tank. The temperature was raised to 86° C. and the polymerization reaction was allowed to continue for 5 hours. The reactor contents were then placed in a methanol-hydrochloric acid solution and allowed to soak overnight. The product was then filtered, washed and dried. There was recovered 5.4 grams of vinyl chloride polymer.

*Example VII*

A catalyst complex of dibutyl tin dihydride and titanium tetrachloride in a molar ratio of 1.00:5.68 was prepared by slowly adding 10 ml. of dibutyl tin dihydride in 50 ml. of heptane to a stirred reactor containing 1 ml. of titanium tetrachloride in 150 ml. of heptane. External heat was applied and the temperature was maintained at approximately 88° C. during the reaction which was continued for about 1 hour. There was then introduced into the reaction vessel 65 ml. of 4-methyl pentene-1. The resulting polymerization reaction was allowed to run 6 hours at an average temperature of about 85° C. The reactor contents were then placed in a methanol-hydrochloric acid solution and allowed to soak overnight. Thereafter the product was filtered and then redissolved in boiling xylene. A second filtration was made followed by reprecipitation in methanol. The recovered 4-methyl pentene-1 polymer had a melting point of 198°–202° C.

*Example VIII*

A catalyst complex of dibutyl tin dihydride and titanium tetrachloride in a molar ratio of 1.00:23.30 was prepared by adding 5 ml. of dibutyl tin dihydride in 75 ml. of cyclohexane to a reactor containing 0.15 ml. of titanium tetrachloride in 100 ml. of cyclohexane. External heat was applied and the temperature was maintained at approximately 79° C. during the reaction which was continued for about 1 hour. There was then introduced into the reaction vessel 55 ml. of 4-methyl pentene-1. The resulting polymerization was allowed to run 6 hours at an average temperature of about 75° C. The reactor contents were then placed in a methanolic hydrochloric acid solution and allowed to soak overnight. About 1 gram of polymer was isolated.

*Example IX*

A catalyst complex of dibutyl tin dihydride and titanium tetrachloride in a molar ratio of 1.00:5.68 was prepared by adding 5 ml. of dibutyl tin dihydride in 50 ml. of toluene to a nitrogen blanketed glass reactor containing 100 ml. of toluene and 0.5 ml. of titanium tetrachloride. External heat was applied to give a temperature of 52° C. and the reaction was allowed to continue for 1 hour. There was then introduced into the reactor 48 ml. of isoprene. The resulting reaction was allowed to run for 4 hours at an average temperature of 54° C. The reactor contents were then placed in a methanol-hydrochloric acid solution and allowed to soak overnight. After filtration 3.9 grams of polyisoprene were recovered.

The process of this invention may incorporate the use of antioxidants, dispersants, mixtures of initiators and other features which might occur to skilled chemists. The polymers made by the process of this invention are useful in the preparation of films, fibers, filaments and molding compositions.

It is not intended that the invention be limited to the above specific examples of materials and reaction conditions, but only by the appended claims in which it is intended to claim all novelty inherent in the invention, as well as all modifications coming within the spirit and scope of the invention.

What is claimed is:

1. A process of the homopolymerization of acrylonitrile which comprises reacting the same in the presence of a catalytic amount of a complex catalyst obtained by the reaction of an organo tin hydride of the general formula:

$$R_n SnH_{n_1}$$

wherein R is a hydrocarbon radical containing from 2 to 20 carbon atoms, $n$ is a whole number of from 2 to 3 and $n_1$ is a whole number of from 1 to 2, and a metal halide of the general formula:

$$MX_n$$

wherein M is a metal selected from groups IVB and VB of the periodic table of elements, X is a halide and $n$ is an integer of from 3 to 4, under inert conditions, in the presence of a hydrocarbon solvent, at a temperature in the range of 0° C. to 250° C. and a pressure in the range of from 1 to 150 atmospheres absolute.

2. The process of claim 1 wherein said organo tin hydride and said metal halide are present in a molar ratio of from 1.00:0.50 to 1.00:25.00.

3. The process of claim 1 wherein the organo tin hydride is dibutyl tin dihydride.

4. The process of claim 1 wherein the organo tin hydride is triphenyl tin hydride.

5. The process of claim 1 wherein the metal halide is titanium tetrachloride.

6. The process of claim 1 wherein the metal halide is zirconium tetrachloride.

References Cited in the file of this patent

UNITED STATES PATENTS 2,846,427   Findlay _____ Aug. 5, 1958

FOREIGN PATENTS 545,968   Belgium _____ Sept. 10, 1956

OTHER REFERENCES

Pauling: General Chemistry, Freeman (1947), page 61.
Partington: A Textbook of Inorganic Chemistry, 6th ed., MacMillan & Co. (1953), pp. 367–371.